106-F4

*solid $Na_2SiO_3 \cdot 9H_2O$*
*no tempering water needed*

March 7, 1950  H. J. DAUSSAN  2,499,729
REFRACTORY COMPOSITIONS FOR USE
IN FOUNDRY AND THE LIKE
Filed May 21, 1945

Henri Jean Daussan
INVENTOR
By
his ATTORNEY

Patented Mar. 7, 1950

2,499,729

UNITED STATES PATENT OFFICE 2,499,729

REFRACTORY COMPOSITIONS FOR USE IN FOUNDRY AND THE LIKE

Henri Jean Daussan, Metz, France

Application May 21, 1945, Serial No. 594,903
In France June 11, 1943

Section 1, Public Law 690, August 8, 1946
Patent expires June 11, 1963

3 Claims. (Cl. 106—55)

1

The invention relates to refractory compositions for use in the casting of ingots and the lining of metallurgical furnaces and the like.

Mortars, cements, grouts, plasterings and refractory concretes are commonly used for the building, protection, upkeep and repair of walls of furnaces or fire-places. Such compositions generally consist of powders or fragments of solid materials tempered with more or less water, according to the desired degree of fluidity, depending on the nature of the product to be obtained (mortar, plastering, grout, etc.). The composition of these granulated or powdered substances varies according to the temperature and to the physical or chemical actions to which the products are intended to withstand. Substances in common use are silica, alumina, clay, lime, chamotte, kaolin, fragments of terra cotta, quartz, magnesia, graphite, Carborundum, zircon, chromites and so forth.

In practice, these products are shipped to the spot of work in bags or metallic receivers, and then tempered on the premises with water, just prior to use. They are also conditioned in the form of refractory pastes or plasters ready for use, i. e. tempered and kneaded beforehand with the necessary amount of water and then shipped in tight receivers.

The present invention aims to do away with such conditioning, while offering a product which is ready for use, i. e. a powdered or granulated product used as such, without any addition of water, the water necessary for the setting of this powdered or granulated mass into an integral block being included in the dry product and liberated under the action of heat, for instance, at the temperature of still hot walls of furnaces or the like, on which the product is applied or by a subsequent heating. The water thus given up acts as would do tempering water, after which the mass sets, hardens and can thereafter be baked, by the action of the heat stored up in the wall or by special heating.

Use may be made for this purpose of any solid substance capable, when heated, to give up water, this latter being either water of crystallization, or water chemically or otherwise included in the dry substance.

Water-liberating substances of this kind are exemplified by the alkaline silicates.

By way of example, crystallized hydrated sodium metasilicate $Na_2SiO_3.9H_2O$ is delivered commercially as a finely ground whitish powder, melting toward 43° C. and boiling toward 108°. In the molten state, it corresponds to an aqueous solution of sodium silicate $Na_2SiO_3$ which, at its melting point (near 43° C.), has a specific gravity of 1.550. If such crystallized hydrated metasilicate in powdered state is very homogeneously mixed with one or several of the ordinary ingredients used in the manufacture of mortars, grouts, plasterings and refractory concretes, in the desired proportion, the water of crystallization set free, as soon as the temperature reaches the melting point, gives rise to an aqueous solution of sodium silicate which imparts to the mass the desired degree of moisture.

In blending this new composition, due account should of course be taken of the influence of the silicate solution thus liberated upon the setting and the hardness of the coating and its resistance to fire and to the chemical influences to which it will be subjected after drying, hardening or baking.

Under the action of heat, for instance the heat of the walls to which it is applied, the powdered or granulated product becomes gradually and quite uniformly moistened; it then dries up and is immediately transformed into a compact and hard refractory mass, the hardness and resistance to fire of which depend on the nature and the amounts of the powdered or granulated substances to which the sodium hydrated metasilicate has been previously mixed, in conditions similar to the products already known when tempered with admixed water.

Among the various advantages of the product according to the invention, there may be mentioned:

(1) Ready manufacturing of the product, merely consisting in blending powders or granulated solids or fragments;

(2) Cheap and easy shipment of the product in all sorts of bags or containers;

(3) Easy laying on: the tempering water being, as it were, measured in advance, the product can be used by an untrained workman, by projection, spreading or ramming the product without requiring moistening, kneading or tempering. Setting takes place automatically and very rapidly.

(4) The water is uniformly distributed in the dry products in such amount that the solution set free impregnates the whole mass, without excess, whereby, setting takes place gradually, starting from the hot part; thus are avoided the difficulties connected with the application of a water-tempered product, caused by the formation of steam which becomes interposed between the hot wall and the product and produces swellings, blisters, etc.

Obviously, the product according to the invention should be kept in cool places.

The following compositions given by weight and containing crystallized hydrated metasilicate Na₂SiO₃.9H₂O in powdered condition can be applied in metallurgical plants, coking plants, etc.

*Example 1*

| | |
|---|---|
| Sodium metasilicate | 25 |
| Finely powdered silica (sand or quartz) | 75 |
| | 100 |

*Example 2*

| | |
|---|---|
| Sodium metasilicate | 50 |
| Silicious graphite containing 45% of C finely powdered | 50 |
| | 100 |

*Example 3*

| | |
|---|---|
| Sodium metasilicate | 40 |
| Graphite | 50 |
| Powdered silica (sand or quartz) | 10 |
| | 100 |

*Example 4*

| | |
|---|---|
| Sodium metasilicate | 33 |
| NaOH | 5 |
| Finely powdered silicious sand optionally containing 3 to 4% Al₂O₃, as well as a small percentage of MgO, CaO, Fe₂O₃, etc | 62 |
| | 100 |

*Example 5*

| | |
|---|---|
| Sodium metasilicate | 58 |
| Powdered china clay | 42 |
| | 100 |

*Example 6*

| | |
|---|---|
| Sodium metasilicate | 21 |
| Finely powdered silica | 63 |
| Finely powdered china clay | 16 |
| | 100 |

*Example 7*

| | |
|---|---|
| Sodium metasilicate | 15 |
| Fragments of refractory materials and terra cotta, grains from 0 to 5 mm | 30 |
| Finely powdered silicious sand | 55 |
| | 100 |

Magnesia, calcined at 100° C. and mixed with metasilicate also yields an excellent product. Metasilicate may also be mixed with powdered Carborundum or with zircon, lime and starch, or with chromite. In a broad sense, powdered crystallized metasilicate Na₂SiO₃, 9H₂O may be mixed, in proportions easy to determine in each particular case, with all refractory ingredients heretofore known.

Obviously, the invention is not limited to the use of nonahydrated sodium metasilicate and its scope includes any other alkali metasilicate or other silicate crystallizing with any other number of molecules of water, or any other crystallized hydrated substance in powdered state or any mixture of two or more of such substances, the water of which is set free under the action of heat. Water soluble alkaline silicates are however particularly convenient for this purpose.

Said products can be used in metallurgical plants for the repair or protection of the bottom of ingot moulds, of furnace walls, of lids of Pits furnaces, etc., especially when the available time is very short, as is generally the case in Thomas steel-works.

Some uses of the product according to this invention are illustrated by way of example, in the accompanying drawings, wherein.

Figure 1:
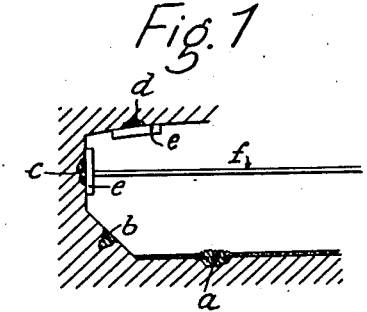
Fig. 1 is a partial vertical section of the working chamber of a furnace.

Fig. 1 shows in vertical section a portion of the refractory masonry of a furnace and illustrates the use of the new composition. On the bottom, a superficial erosion has been represented at $a$; to repair this part of the furnace wall, the product is deposited thereon, for instance, by means of a shovel or a trowel and preferably rammed; the repair takes place automatically by the action of the heat stored up in the wall. Fig. 1 also shows how the product can be spread in a layer over the whole bottom in order to protect the masonry against physical or chemical injuries, for instance in the case of the bottom of a furnace.

The product can also be projected, by means of a compressed air tool or gun into fissures or erosions, (see $b$ or $c$), and also for jointing together the elements of brickworks or inclined or vertical walls, whilst these walls are still hot; in case of a vault (erosion $d$), it is necessary to keep the product in contact with the wound by means of a plate $e$, held in place in any suitable manner during setting of the powder. This precaution may also prove useful in case of an erosion such as $c$ on a vertical wall, in which case plate $e$ may be provided with a handling rod $f$.

Figs. 2, 3, 4 and 5 show ingot moulds open at both ends and resting on a cast iron or steel base. When casting steel in moulds, it is rather usual to spread on the base of the moulds a milk of lime or a grout of clay or to mason up on this base a coating of silico-aluminous bricks, in order to prevent the ingot from adhering to the base and to protect same against destruction by the jet of cast steel.

These processes present many drawbacks: they generally cause refractory substances to be mixed with the metal of the ingot; the refractory brickwork, which has the same defect, further requires a long and delicate work requiring a skilled labour. In the most favourable cases, the brickwork resists four or five castings.

Figure 2:
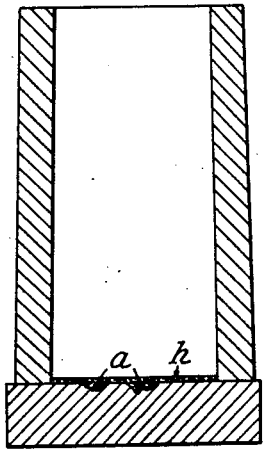
Figs. 2 to 5 are vertical sections of ingot moulds.

Fig. 2 shows how to protect the base of the mould and prevent adhesion of the ingot by means of the powder, according to the invention. Using for instance one of the powders according to Formula 1 or 4, this is rammed into the depressions caused by the erosions. Setting may take place under the action of the heat stored up in the base, during the preceding casting. A coating $h$ of the product can be advantageously spread on the whole base, in order to protect same against the casting jet and prevent adhesion of the ingot.

Figure 3:
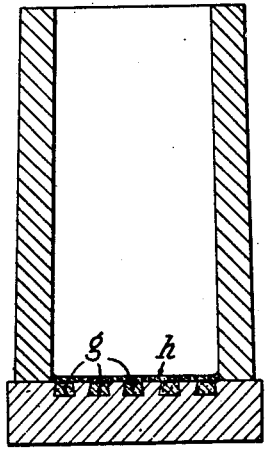

Fig. 3 shows a mould resting on a special base formed with grooves or cells $g$ having for example the shape of truncated cones or pyramids tapering upwardly. The powdered mass settling in these cells is permanently attached to the base when heated and dried, thus preventing scaling off of the product, owing to differences of expansion.

Figure 4:
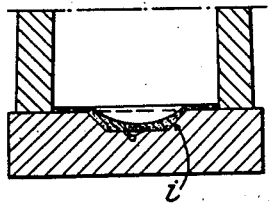
Figure 5:
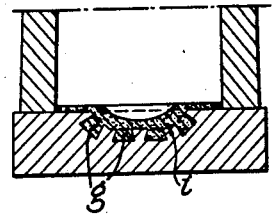

Figs. 4 and 5 show the application of the product to a depressed mould base $i$ used in steel-works for reducing the fall of the foot of ingots.

Compositions rich in alumina, e. g. the composition of Example 5 should not be used for this purpose due to the risk of refractory inclusions in the ingot. On the contrary, compositions of Examples 1 and 4 are suitable for the application to mould bases. Indeed, particles of the products, inevitably carried along owing to the violent impact of the casting jet on the base, form a very fluid silico-alkaline slag which is useful to scorify and to carry away any fragments of refractory substances carried with the steel, including the aluminous fragments originating from the pockets, nozzles and runners.

Experience proved that important amounts of the composition according to Formulas 1 and 4, placed on the bottom of a mould in such manner as not to adhere to the base, rise through the molten ingot and perform thoroughly their purifying work, and that the slags collecting at the head of the ingot are operative to eliminate the so-called pipes or funnels in the upper part of the ingot. Thus, driving along of particles of the composition according to Formulas 1 and 4, far from being detrimental, tend to improve the quality of the ingots.

Metallic grates or irons may also be embedded in the product as the re-enforcements of re-inforced concrete or cement, and they may be fixed to the wall or other structure to which the product is applied.

It is obvious that this invention is not limited to the embodiments above described and that many modifications may be devised within the scope of the invention.

Having now described my invention what I claim as new and desire to secure by Letters Patent is:

1. A refractory composition of matter for lining surfaces such as moulds and furnace walls, consisting of a powdered mixture of about 42 to 85% by weight of a comminuted dry refractory substance of the group consisting of silica (sand, quartz), siliceous graphite, china clay, Carborundum, zircon, chromite and mixtures thereof, and about 58 to 15% of $Na_2SiO_3.9H_2O$ having a melting point of 43° C. and which gives up the water of crystallization when heated above 43° C. and produces self-tempering and setting of the mixture upon application over the surface to be lined.

2. A refractory composition of matter for lining ingot moulds and furnace walls consisting of a mixture of about 40% by weight of hydrated sodium metasilicate, 50% of graphite and 10% of a powdered silica.

3. A refractory composition of matter as claimed in claim 2 comprising substantially by weight:

| | Per cent |
|---|---|
| Sodium metasilicate | 33 |
| Sodium hydroxide | 5 |
| Finely powdered silicious sand containing 3 to 4% of $Al_2O_3$ | 62 |

HENRI JEAN DAUSSAN.

REFERENCES CITED

The following references are of record in the file of this patent:

UNITED STATES PATENTS

| Number | Name | Date |
|---|---|---|
| 982,252 | Collins | Jan. 24, 1911 |
| 1,589,604 | Lee | June 22, 1926 |
| 1,688,350 | Pettis | Oct. 23, 1928 |
| 1,693,923 | Hess | Dec. 4, 1928 |
| 1,764,544 | Baumgardner | June 17, 1930 |
| 1,889,007 | Wallace | Nov. 29, 1932 |
| 2,009,566 | Stowell | July 30, 1935 |
| 2,183,424 | Clark | Dec. 12, 1939 |

FOREIGN PATENTS

| Number | Country | Date |
|---|---|---|
| 119,283 | Australia | Nov. 27, 1944 |

OTHER REFERENCES

Searle: Refractory Materials (1924), pp. 588-9.